United States Patent [19]

Hajek

[11] Patent Number: 5,092,267
[45] Date of Patent: Mar. 3, 1992

[54] POWDER COLLECTION UNIT WITH INTEGRAL DRYER

[75] Inventor: Bedrich Hajek, New Haven, Conn.

[73] Assignee: S. L. Electrostatic Technology, Inc., Branford, Conn.

[21] Appl. No.: 538,521

[22] Filed: Jun. 15, 1990

[51] Int. Cl.⁵ .................................. B05B 5/053
[52] U.S. Cl. .................................. 118/694; 34/10; 34/57 A; 118/621; 118/653; 118/600; 118/309; 118/310; 118/312; 222/413; 414/289; 414/291; 414/295; 414/320
[58] Field of Search .............. 118/308, 309, 310, 311, 118/312, 621, 600, 602, 654, 653, 58, 64, 63, 694; 198/550.1; 414/288, 289, 291, 293, 295, 296, 320, 321; 34/10, 57 A, 105, 181, 216; 222/226, 413

[56] References Cited

U.S. PATENT DOCUMENTS

| | | | |
|---|---|---|---|
| 1,948,021 | 2/1934 | Burton | 222/226 |
| 2,676,562 | 4/1954 | Dorfan | 118/309 |
| 2,831,612 | 4/1958 | Smith | 222/413 |
| 3,785,512 | 1/1974 | Gatz et al. | 414/326 |
| 4,123,175 | 10/1978 | Carlson et al. | 366/151 |
| 4,275,808 | 6/1981 | Bullivant | 198/550.1 |
| 4,417,544 | 11/1983 | Nishimura | 118/311 |
| 4,543,274 | 9/1985 | Mulder | 118/308 |
| 4,651,380 | 12/1985 | Mulder et al. | 118/308 |
| 4,662,309 | 5/1987 | Mulder | 118/312 |
| 4,697,750 | 10/1987 | Prew | 414/326 |
| 4,726,715 | 2/1988 | Steen et al. | 198/550.1 |
| 4,824,295 | 4/1989 | Sharpless | 118/312 |

FOREIGN PATENT DOCUMENTS 0041689 2/1986 Japan .................. 198/550.1

Primary Examiner—Willard E. Hoag
Attorney, Agent, or Firm—Ira S. Dorman

[57] ABSTRACT

Apparatus for collecting and drying powder used for electrostatic coating of a workpiece has air injection means incorporated into the collection bin both to dry and also to homogenize powder recovered, just prior to withdrawal from the bin.

17 Claims, 3 Drawing Sheets

POWDER COLLECTION UNIT WITH INTEGRAL DRYER

BACKGROUND OF THE INVENTION

Powder coating techniques are now extensively used in industry in connection with a wide diversity of workpieces. A persistent and virtually universal problem associated with such operations involves the effective handling of unused powder (particulate coating material), particularly when coating occurs from fluidized bed or spraying operations because of the natural tendency for the relatively fine particles of powder to drift. This creates an annoyance and hazard to personnel present in the vicinity, and it increases operating costs due to waste of the coating material.

Systems have therefore been developed for controlling fugitive powder. They usually employ vacuum-operated collecting tanks, into which powder may be withdrawn from the coating area to provide a reservoir from which recycle may be had. Many of these systems are effective and quite satisfactory.

Virgin powder must of course be introduced into any such coating system to replenish that which has either been deposited upon the workpiece or depleted through unavoidable losses. It will be appreciated that the makeup of powder taken from the coating operations will vary from that freshly supplied, and that adding a quantity of virgin powder to powder that has been recycled and collected will (if not otherwise mixed) result in distinct strata within the supply; coatings produced therewith would tend to lack desirable (or indeed, essential) uniformity.

Moreover, for the achievement of optimal coatings it is important that the powder be of low moisture content, usually requiring that it be dried prior to introduction into the coating unit. Dryness is particularly important when deposition is achieved by electrostatic attraction, as for example by the method taught in Dunford et al U.S. Pat. No. 4,606,928, and in other patents designated therein.

A very effective system satisfying many of the forgoing needs is described in Carlson U.S. Pat. No. 4,123,175. However, the Carlson system includes no means for drying of the powder, and normally a separate drying chamber (interposed between the collection unit and the coating apparatus) is employed therewith; such a dryer may function by utilizing injected air to fluidize the powder supported upon a porous plate. Primary among the disadvantages of an arrangement of the kind are the time lags that occur both in commencement of the supply of powder to the coating chamber, when it is called for, and also in termination of the flow after the demand has been satisfied.

Accordingly, the main objects of the present invention are to provide novel apparatus for collecting powder used for coating workpieces, which apparatus inherently dries the powder and ensures the uniformity of the powder blend that is withdrawn therefrom, and to provide a novel coating system utilizing such apparatus.

Other objects of the invention are to provide an apparatus and system having the foregoing features and advantages, which are also of relatively simple and inexpensive construction, and which are efficient in operation and convenient to use.

SUMMARY OF THE INVENTION

It has now been found that certain of the foregoing and related objects of the invention are readily attained by the provision of apparatus comprising a collection bin, inlet means adjacent the upper end portion of the bin for introducing powder thereinto, take-off means adjacent the lower end portion for effecting the removal of powder, and drying means. The take-off means removes powder from along a plurality of withdrawal paths extending transversely across the bin, and the drying means is comprised of a plurality of air-injection ports which open upwardly, along a path between the powder withdrawal paths, and which are connected to a pressurized air supply.

The apparatus will normally include a powder recovery chamber and a powder loading chamber disposed above the bin. In such a case the inlet means will comprise both a passageway connecting the recovery chamber to the interior of the bin, and also an opening between the loading chamber and the bin; the passageway will generally be defined by a duct having a valve interposed therein. The apparatus will in addition desirably include a valved conduit for operatively establishing gas flow communication between the loading chamber and the recovery chamber.

The take-off means of the apparatus will most desirably comprise a plurality of auger assemblies, each consisting of a tubular housing extending transversely across the lower end portion of the bin and opening upwardly to the interior thereof, and a screw seated in the housing and rotatable about its longitudinal axis. The drying means will desirably comprise a tubular manifold disposed between the housings of the auger assemblies, each manifold having a plurality of upwardly directed nozzles providing the air-injection ports thereof. The auger assembly housings and the manifolds of the drying means will advantageously be attached to one another by elements that provide a continuous, impermeable wall across the lower end portion of the bin. Usually the apparatus will include a multiplicity of the tubular auger housings and a plurality of the tubular manifolds, with each manifold disposed between an adjacent pair of the auger housings.

Other objects of the invention are attained by the provision of a powder coating system, including the powder collection and drying apparatus described above. In addition, the system will include a coating unit consisting of a housing defining a coating chamber, a plate in a lower portion of the chamber for supporting powder, an inlet through which powder can be supplied to the upper surface of the plate, and an outlet through which powder can be withdrawn from an upper portion of the chamber. The system will also include powder transport means comprised of a first conduit operatively connecting the outlet from the coating unit to the inlet means of the collection and drying apparatus, and a second conduit operatively connecting the takeoff means of the apparatus to the inlet of the coating unit. Supply means of the system, operatively interposed in the "second" conduit of the transport means, is activatable to effect the removal of powder by the take-off means and the supply thereof to the plate of the coating unit; a sensor senses the level of powder on the supporting plate, and signals the supply means for activation thereof when the level of powder falls below a set value. The system of the invention will most desirably employ an electrostatic fluidized bed

DETAILED DESCRIPTION OF THE ILLUSTRATED EMBODIMENT

Figure 1:
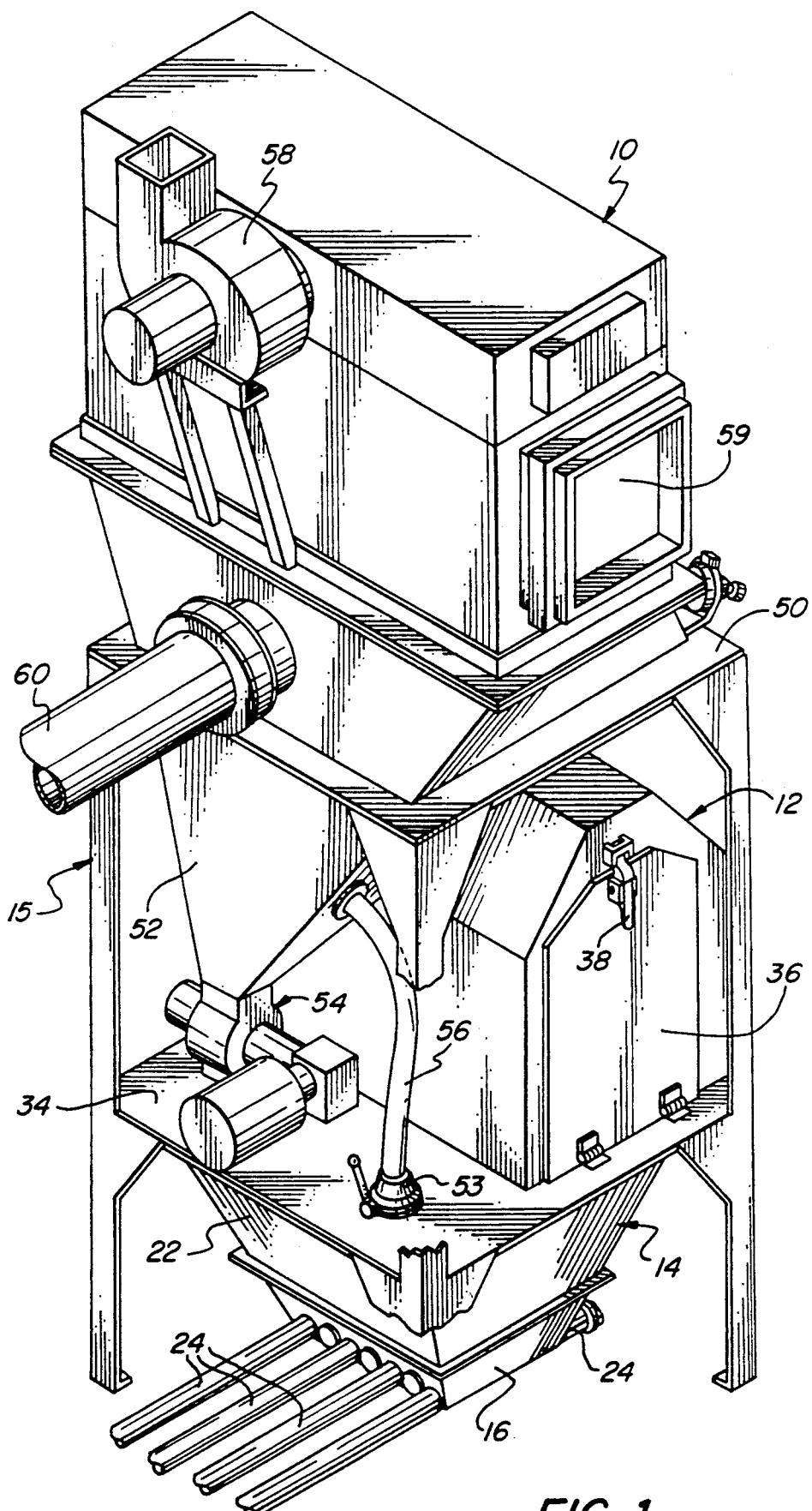
FIG. 1 is a fragmentary, perspective view illustrating powder collection and drying apparatus embodying the present invention.
Figure 2:
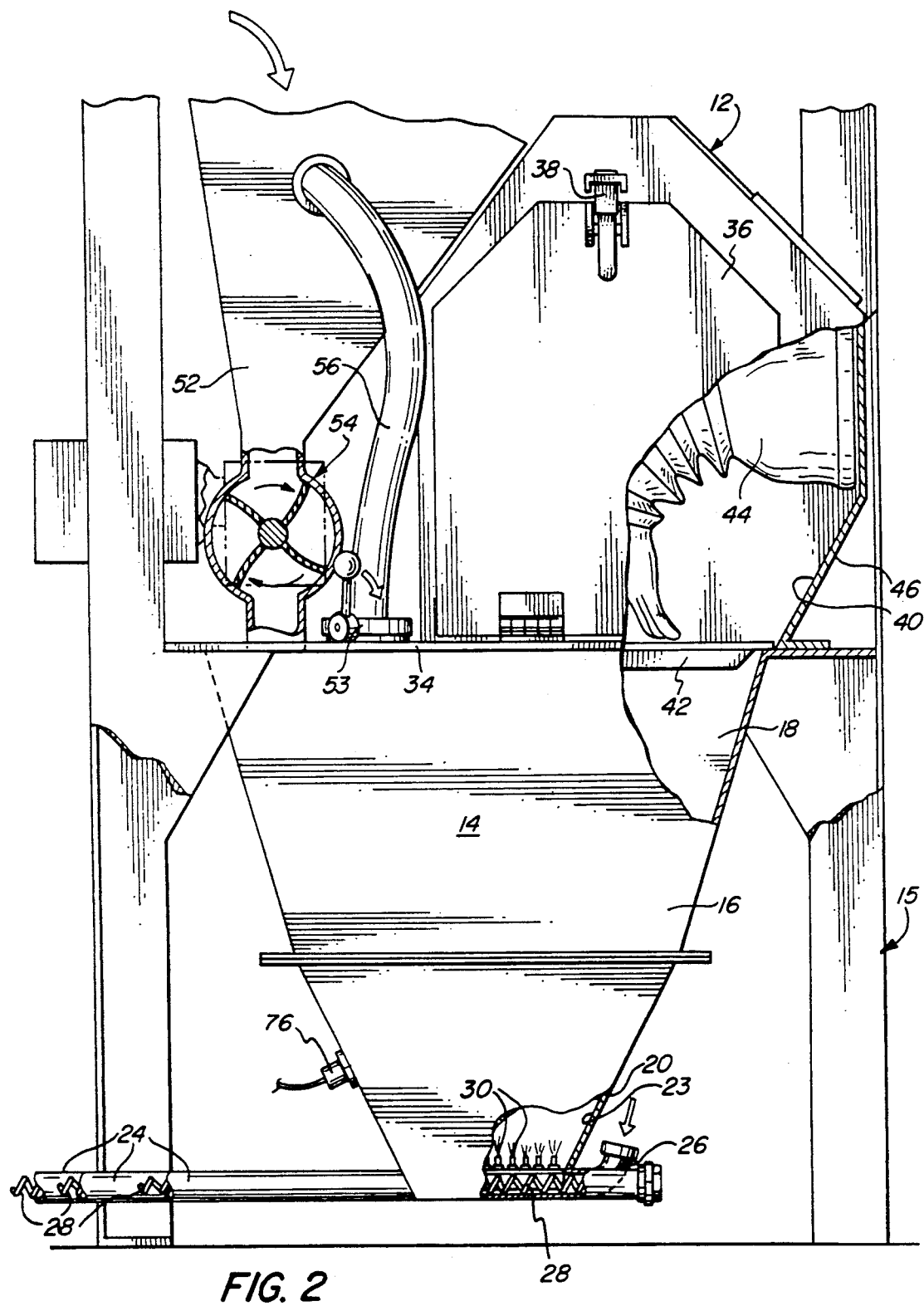
FIG. 2 is a fragmentary, elevational view illustrating a lower portion of the apparatus of FIG. 1, drawn to a scale somewhat enlarged therefrom and with sections broken away to expose internal features.
Figure 3:
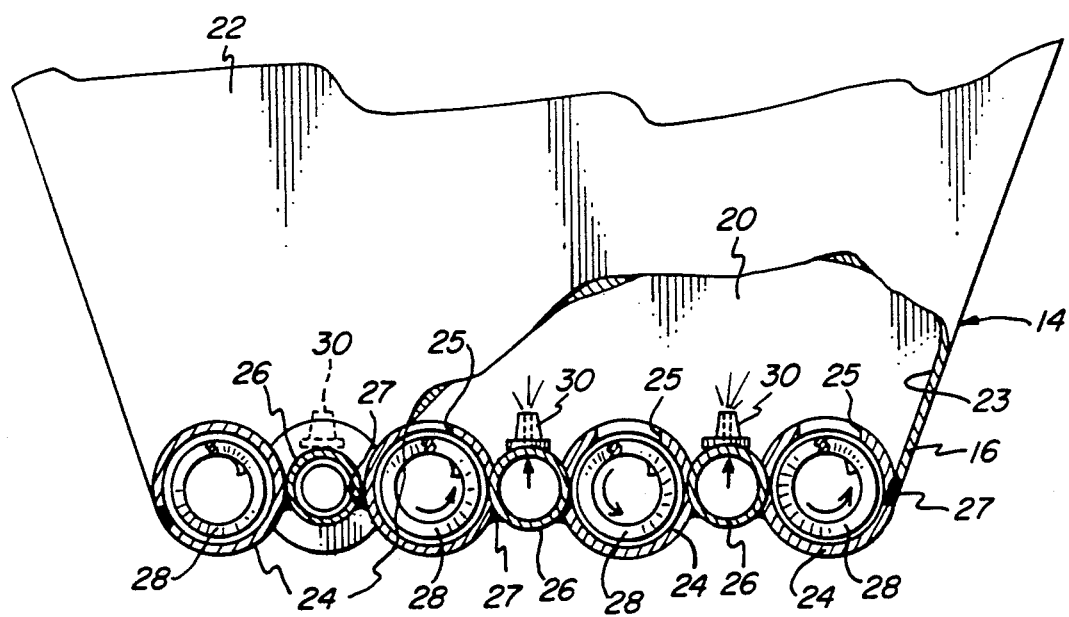
FIG. 3 is a fragmentary, elevational view of the bottom portion of the collection bin utilized in the apparatus of the foregoing Figures, drawn to a further enlarged scale and with a section broken away to expose internal features.

Turning now in detail to FIGS. 1-3 of the drawings, therein illustrated is a powder collection and drying apparatus embodying the present invention and including a recovery chamber housing, a loading chamber housing, and a collection bin, generally designated respectively by the numerals 10, 12 and 14. The housings 10 and 12 and the bin 14 are vertically stacked, and are supported upon a stand, generally designated by the numeral 15.

The bin 14 is of generally rectangular cross section (taken in horizontal planes), and is comprised of four walls 16, 18, 20, 22, each wall having an upper section and a lower section. The wells converge downwardly so as to form a hopper-like space 23 within the bin 14.

Four parallel auger tubes 24 traverse the bottom of the bin 14 in a common plane, and each is longitudinally slotted at 25 to open upwardly and communicate with the space 23. An air tube 26 is interposed between adjacent pairs of auger tubes 24; lines of weldment 27 join the tubes 24, 26 to one another and also join the endmost auger tubes 24 to the lower edges of the Walls 16, 18, thereby forming a Wall enclosing the bottom of the bin. A screw 28 is rotatably disposed Within each auger tube 24, and each air tube 26 carries a line of upwardly directed air nozzles 30, which open into the space 23 at a point between the two adjacent auger tubes.

The upper end of the bin 14 is partially covered by a platform 34, which is supported by the stand 15 and in turn supports the housing 12 of the loading chamber. The housing 12 has an associated hinged door 36, normally held in closed position by the latch mechanism 38. The space 40 within the loading chamber housing 12 communicates with the internal space 23 of the bin 14 through an open supporting floor 42 (which may be of expanded metal construction), and a pair of arm and hand receiving flexible gloves 44 (only one of which is visible) are sealingly engaged within apertures (not seen) through the wall 46 of the housing; they permit access to the closed chamber for manipulation of a container therewithin supported on the floor 42.

Figure 4:
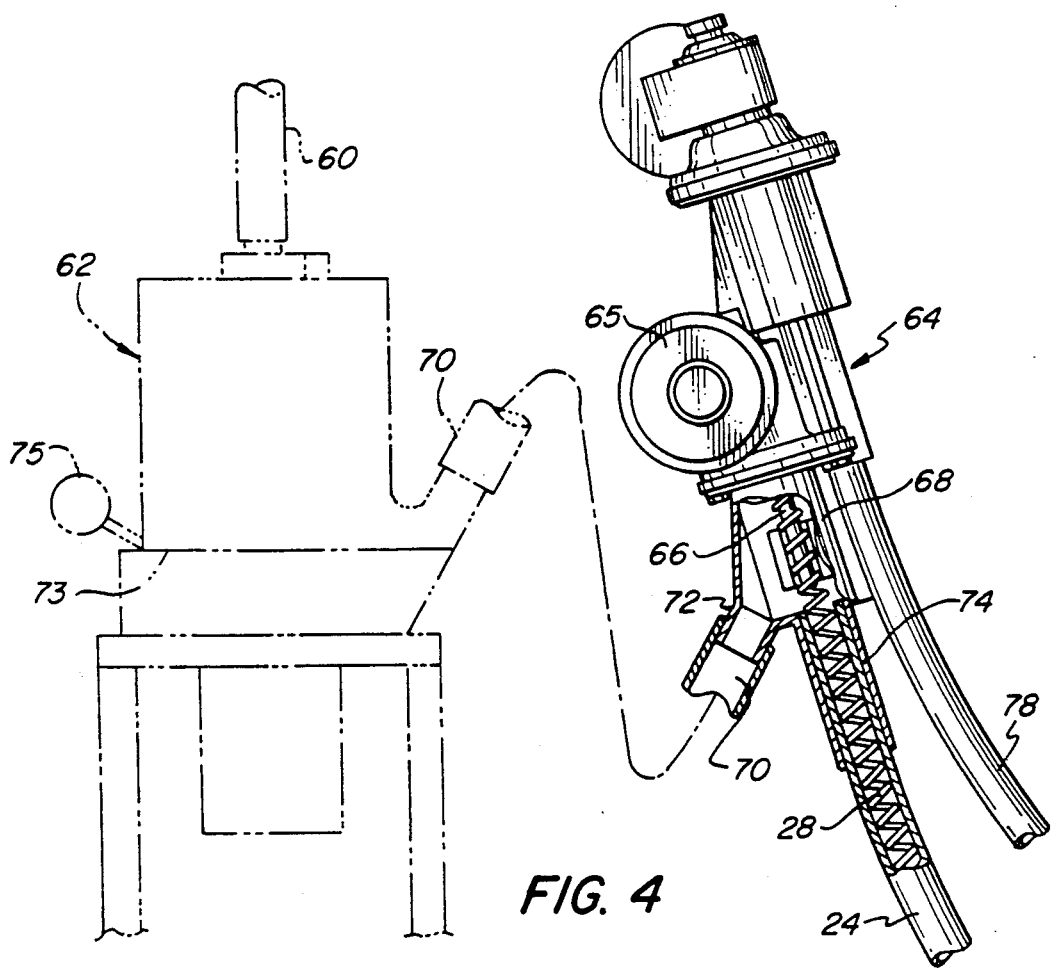
FIG. 4 is a fragmentary, elevational view, in partial section, showing the motor and gear box unit utilized to transport powder from the collection bin to the coating unit, the latter being shown therein diagrammatically and in phantom line.

A second, more elevated platform 50 is Provided on the stand 15 to support the housing of the recovery chamber, from the base of which extends a downwardly tapered hopper 52, which communicates with the bin 14 through a motor-driven rotary valve air lock, generally designated by the numeral 54. A vacuum hose 56 connects the hopper 52 directly to the bin space 23 (bypassing the air lock 54), and an adjustable butterfly valve mechanism 53 is interposed therein to control the rate of air flow. The recovery chamber housing 10 is evacuated by a blower 58; it is fitted With an explosion safety valve at 59, and has other features that are conventional for optimal operation. A conduit 60 connects the housing 10 to the coating chamber of an electrostatic fluidized bed coating unit, generally designated by the numeral 62 and shown in FIG. 4.

One end of each auger tube 24 is attached to the housing 68 of a motorized drive unit, generally designated by the numeral 64, which includes appropriate step-down gearing and transmission means. The housing 68 is fitted With appropriate nipples 72, 74, one of which receives the end of the auger tube 24 and the other of which receives the end of conduit 70, connected to the coating unit 62. The corresponding end of the screw 28 within the auger tube 24 is affixed to a shaft 66 powered by the drive unit motor 65, to effect rotation of the screw 28 and thereby the delivery of powder to the housing 68.

A porous support plate 73 is mounted within the coating unit 62, upon which plate powder transported through the conduit 70 is deposited. The coating unit has an associated level sensor 75, which serves to indicate whether the level of powder supported upon the plate 73 is sufficient; if it is not, the sensor 75 actuates (by appropriate means, not illustrated) the motor 65 of the drive unit 64. A level sensor 76 is also provided on the bin 14, which serves to alert the operator (by means not shown) as to the need to add fresh powder.

Coating of workpieces is of course carried out in the unit 62, utilizing the particulate coating material supplied thereto and well-known electrostatic principles described in the art. When the level of coating material in the unit 60 becomes inadequate (as indicated by the sensor 75, set to indicate a suitable value), the motor 65 of the drive unit 64 is actuated to rotate the shaft 66 and thereby turn the screw 28. This causes powder collected in the bottom of the bin 14 to be transported to the housing 68 of the drive unit 64 and, in turn, through the conduit 70 to the support plate 73 of the coating unit 62.

During operation of the coating unit the blower 58 on the powder recovery chamber housing 10 operates to establish a vacuum therewithin, thereby withdrawing unused powder from the coating chamber of the unit 62 through the conduit 60 Returned powder passes through the hopper 52 and into the space 23 within the bin 14 through the rotary valve 54, which is also operated continuously when the apparatus is in use; the valve 54 serves not only to meter powder to the bin 14, but also to maintain the recovery chamber under vacuum When the powder within the system becomes sufficiently depleted to actuate the level detector 76, the operator may add to the supply. This is done simply by opening the hinged door 36, placing a container of virgin powder upon the floor 42, closing the door and then opening the container and dumping its contents into the bin 14. To ensure that the powder does not escape from the system when the door 36 is ajar, the butterfly valve 53 will be opened to establish a vacuum in the chamber of the housing 12 (drawn through the bin 14). As will be appreciated, the bin 14 and chamber of the housing will normally operate at atmospheric pressure, and therefore the butterfly valve 53 Will usually be in closed position.

Each of the auger screws 28 will normally be associated with a separate drive unit 64, thereby enabling the collection and drying apparatus of the invention to service more than a single coating unit. Also, the tube 78 shown in FIG. 4 may be attached to a separate collection and supply system, so that one coating unit may be supplied from more than a single source (e.g., to permit the powder used for coating to be readily changed). It will of course be appreciated that the air supply tubes 24 may be connected to a common manifold from Which air Will flow (as indicated by the arrow in FIG. 2). in any event, the air injected through the nozzles 30 will serve to dry powder delivered to the bin 14, and also to blend recovered powder with freshly added powder, thereby ensuring homogeneity in the material supplied to the coating unit.

A primary advantage of the present system resides in the avoidance of lag or delay, both from the time that the coating unit calls for additional powder and the time that it is supplied thereto, and also from the time that the demand has been satisfied and the time that the supply actually stops. As noted above, prior art systems have utilized separate drying units (typically in the form of a fluidized bed) interposed between the powder collecting apparatus and the coating apparatus. This has caused both the lag in satisfying demand and also the subsequent over-supply of coating material, mentioned above. Furthermore, arrangements heretofore used have required excessive amounts of floor space and unduly complex valving arrangements, and have suffered from other drawbacks not present in the apparatus and system herein described.

Thus, it can be seen that the present invention provides a novel apparatus for collecting powder used for coating workpieces, which apparatus inherently dries the powder and ensures the uniformity of the blend that is withdrawn from it. The invention also provides a novel coating system utilizing such apparatus, and the apparatus and system are of relatively simple and inexpensive construction, and are efficient in operation and convenient to use.

Having thus described the invention, what is claimed is:

1. Powder collection and drying apparatus, comprising: a collection bin having an upper end portion and a lower end portion; inlet means adjacent said upper end portion for introducing powder into said bin; take-off means adjacent said lower end portion for effecting the removal of powder from along a plurality of withdrawal paths laterally spaced from one another and extending transversely across said bin; and drying means comprised of a plurality of air-injection ports opening upwardly along a path in the space between said withdrawal paths and extending therealong, said ports being adapted for connection to a pressurized air supply.

2. The apparatus of claim 1 wherein said apparatus additionally includes a powder recovery chamber and a powder loading chamber disposed above said bin, and Wherein said inlet means comprise both a passageway connecting said recovery chamber to the interior of said bin and also an opening between said loading chamber and said bin.

3. The apparatus of claim 2 wherein said passageway is defined by a duct having a valve therein interposed between said recovery chamber and said bin.

4. The apparatus of claim 3 additionally including a conduit having a valve therein and connected to operatively establish gas flow communication between said loading chamber and said recovery chamber.

5. The apparatus of claim 1 wherein said take-off means comprises a plurality of auger assemblies, each said assembly comprising a tubular housing extending transversely across said lower end portion and opening upwardly to the interior of said bin, and a screw seated in said housing and rotatable about the longitudinal axis there of.

6. The apparatus of claim 5 wherein said drying means comprises a tubular manifold disposed between said housings of said auger assemblies, and a plurality of upwardly directed nozzles providing said air-injection ports.

7. The apparatus of claim 6 Wherein said housings and said manifold are attached to one another by elements that provide, in cooperation with said housings and said manifold, a continuous, impermeable wall across said lower end portion of said bin.

8. The apparatus of claim 6 wherein there are a multiplicity of said tubular housings and a plurality of said tubular manifolds, each of said manifolds being disposed between an adjacent pair of said housings.

9. A powder coating system, comprising:
(a) a coating unit including a housing defining a coating chamber, a plate in a lower portion of said chamber for supporting powder, an inlet through Which powder can be supplied to an upwardly oriented surface of said plate, and an outlet through Which powder can be Withdrawn from an upper portion of said chamber above said plate;
(b) powder collection and drying apparatus comprising a collection bin having an upper end portion and a lower end portion, inlet means adjacent said upper end portion for introducing powder into said bin, take-off means adjacent said lower end portion for effecting the removal of powder from along a plurality of withdrawal paths extending transversely across said bin, and drying means comprised of a plurality of air-injection ports opening upwardly into said bin along a path between said withdrawal paths and adapted for connecting said ports to a pressurized air supply;
(c) powder transport means comprising a first conduit operatively connecting said outlet from said coating unit to said inlet means of said apparatus, and a second conduit operatively connecting said take-off means of said apparatus to said inlet of said unit;
(d) supply means operatively interposed in said second conduit of said transport means and activatable to effect the removal of powder by said take-off means and the supply thereof to said plate through said inlet of said unit; and
(e) a sensor to sense the level of powder on said supporting plate, and to signal said supply means for activation thereof when the level of powder is below a set value.

10. The system of claim 9 wherein said apparatus additionally includes a powder recovery chamber and a powder loading chamber disposed above said bin, and wherein said inlet means comprises both a passageway connecting said recovery chamber to the interior of said bin and also an opening between said loading chamber and said bin, said first conduit connecting said coating unit outlet to said recovery chamber.

11. The system of claim 10 Wherein said passage way is defined by a duct having a valve therein interposed between said recovery chamber and said bin.

12. The system of claim 11 additionally including a conduit having a valve therein and connected to operatively establish gas flow communication between said loading chamber and said recovery chamber.

13. The system of claim 9 wherein said take-off means comprises a plurality of auger assemblies, each said assembly comprising a tubular housing extending transversely across said lower end portion and opening upwardly to the interior of said bin, and a screw sated in said housing and rotatable about the longitudinal axis thereof.

14. The system of claim 13 wherein said drying means comprises a tubular manifold disposed between said housings of said auger assemblies, and a plurality of upwardly directed nozzles providing said air-injection ports.

15. The system of claim 14 wherein said housings and said manifold are attached to one another by elements that provide, in cooperation With said housings and manifold, a continuous, impermeable wall across said lower end portion of said bin.

16. The system of claim 14 wherein there are a multiplicity of said tubular housings and a plurality of said tubular manifolds, each of said manifolds being disposed between an adjacent pair of said housings.

17. The system of claim 9 wherein said coating unit is an electrostatic fluidized bed unit.

* * * * *